United States Patent [19]

Raippo

[11] Patent Number: 4,475,644
[45] Date of Patent: Oct. 9, 1984

[54] METHOD AND APPARATUS FOR FEEDING LUMBER

[75] Inventor: Jorma Raippo, Heinola, Finland

[73] Assignee: Plan-Sell Oy, Finland

[21] Appl. No.: 389,105

[22] Filed: Jun. 16, 1982

[30] Foreign Application Priority Data

Jun. 17, 1981 [FI] Finland .................................. 811893

[51] Int. Cl.³ .............................................. B65G 47/24
[52] U.S. Cl. .................................. 198/407; 198/458; 198/422
[58] Field of Search ............... 198/434, 424, 422, 423, 198/458, 409, 407; 414/745, 748; 144/357, 356, 245 R, 245 A, 245 C, 378; 83/104, 157, 156, 449

[56] References Cited

U.S. PATENT DOCUMENTS

| | | | |
|---|---|---|---|
| 2,468,036 | 4/1949 | Charters | 83/104 |
| 2,588,484 | 3/1952 | Charters et al. | 83/156 |
| 4,240,477 | 12/1980 | Horn et al. | 144/357 X |
| 4,286,638 | 9/1981 | Connolly et al. | 414/745 X |
| 4,289,180 | 9/1981 | Weinzierl | 144/378 |

*Primary Examiner*—Joseph E. Valenza
*Assistant Examiner*—Dennis Williamson
*Attorney, Agent, or Firm*—McGlew and Tuttle

[57] ABSTRACT

The invention relates to a method and apparatus for feeding lumber, especially in connection with a four-band saw for separating and feeding side boards. The problem in four-band sawing is how to separate the boards of a pair of side boards sawed off from the sides of a log or block for further processing such as trimming. This problem is solved so that the side boards that are sawed off from the log are dropped by opening side guards and then directed the side boards by means of adjustable dropping flaps onto a transverse conveyor so that they remain on the conveyor with the cant edge focus up. The boards are then piled on top of each other and/or in a laminating fashion. The side boards are arranged, by shifting them against transient stops of the transverse conveyor, into a pile wherefrom the side boards can be suitably fed further by means of stopping members arranged in connection with the conveyor on a sloping plane. The stopping members can be adjusted into at least two different positions. In the first position the uppermost board of the pile of boards continues its movement but the rest are stopped. In the second position the next side board is released, and the rest are held back. This continues until all the boards are fed.

13 Claims, 12 Drawing Figures

METHOD AND APPARATUS FOR FEEDING LUMBER

FIELD AND BACKGROUND OF THE INVENTION

The present invention relates to a method for feeding lumber, especially in connection with a four-band saw, in order to separate and feed side boards. The invention also relates to an apparatus for working the method.

In four-band sawing the problem is how to separate the pair of side boards, sawed off from both sides of the log, in order to be further processed—for example trimmed.

In the previous art is known a method for separating side boards wherein the side boards are dropped in disorder onto a transverse conveyor to form two piles on both sides of the block. The separation of the boards before further processing is carried out for example by means of a separating pocket and a log hoist.

The drawback of the above described method is that the side boards leave the sawing station along the transverse conveyor in disarray, wherefore it is necessary to employ manpower and clearing equipment—a separating pocket and a log hoist—in order to separate the boards from each other and to feed them one by one for further processing. In the separating pocket the boards tend to turn the wrong side up, i.e. with their cant edge down, so that also swivelling equipment is required in the apparatus. Moreover, the log hoist may break boards and thus cause interruptions in the process. As a whole this kind of apparatus is complicated and susceptible to disturbance. It can be regarded as a hindrance to utilizing the full capacity of the four-band saw.

The Finnish patent application No. 800563 introduces a lumber feeding apparatus where it has been tried to eliminate the aforementioned drawbacks. This application relates to an apparatus where, for instance in the sawing position of a four-band saw, the side boards are transported between side supports along both sides of the block, in a trough on top of support rollers, until the sawing operation is completed. The support rollers are for a moment drawn out of the trough, so that the side boards fall into the two pockets located on both sides of the block between the side supports. In both pockets the boards are pressed against the other stationary pocket and simultaneously against the wall of the trough by means of a moving wall operated by a bellow device filled with pressurized air. Those boards in the pocket that are located against the adjustable wall are sucked into place by employing an underpressure a vacuum. The bellow device is loosened and the bottoms of the pockets opened, so that only those two side boards that are located against the stationary wall both fall into their respective compartments in the conveyor below. The conveyor is then shifted, and the remaining side boards are dropped into their conveyor compartments. The bottoms of the pockets are closed and the same operation phases are repeated with the following side boards.

An advantageous achievement of the above described apparatus is that for example the log hoist becomes unnecessary and the side boards can be placed directly onto the single conveyor. The drawback of the apparatus, however, is that it has a complex structure and therefore it is costly to manufacture. The reliability of the feeding device is also decreased because of the numerous phases of operation. In connection with an apparatus of this kind it is necessary to employ board swivelling means, because the side boards fall into the conveyor chambers arbitrarily. Moreover, the thickness of the lumber to be fed into the process sets certain limitations to the use of the apparatus.

SUMMARY OF THE INVENTION

The purpose of the present invention is to eliminate the above mentioned drawbacks and to realize a simple method and apparatus for feeding lumber, which method and apparatus are suited for separating side boards.

Accordingly, an object of the present invention is to provide a method of heating side boards that a cut from a piece of lumber, in particular a plurality of side boards that are cut from a log or block in a four-band saw, using a device including at least one side guard and preferably a pair of side guards, for holding the boards against the piece of lumber from which they were cut, a first conveyor for transferring the piece of lumber and side boards to the side guard, a transverse conveyor for conveying the side boards transversely of the first conveyor, stop means for holding the boards against movement on the transverse conveyor, and at least one, and preferably a pair of dropping flaps which are movable to direct boards onto the transverse conveyor, comprising opening the side guards to release the side boards from their piece of lumber, positioning the dropping flaps to direct the side board with their cant edges up, onto the transverse conveyor and moving the stop means into a path of the side boards on the transverse conveyor to shift the boards on the transverse conveyor and preferably into piles on the transverse conveyor.

A further object of the invention is to provide an apparatus for achieving the aforementioned method.

The greatest advantages of the feeding method of the invention are its simple structure and its reliability. An essential feature of the feeding method and apparatus of the invention is that the side boards are dropped in a controlled fashion onto the transverse conveyor on top of each other and kept there in couples or in similar fashion, and that the actual separation of the boards takes place further off from the log or block line.

By employing this method and apparatus, it is also possible to achieve the advantage that a double amount of boards can be stored on the transverse conveyor compared to the situation where the boards would be separated into singles already in an earlier phase.

The actual separation of the side boards is carried out while shifting the boards from the transverse conveyor onto another conveyor situated on a lower level. The separation takes place on a sloping plane by utilizing specially arranged stopping means. By this arrangement it is possible to achieve a greater accuracy in the separation than is otherwise possible, because in this phase the boards no longer move in the longitudinal direction. The thickness of the side boards has no effect in the separation, because the sloping plane or the stopping means can be arranged so that they are adjusted according to the type of lumber in question.

In the following the invention is explained in detail with reference to the appended drawings.

DESCRIPTION OF THE PREFERRED EMBODIMENTS

Figure 1:
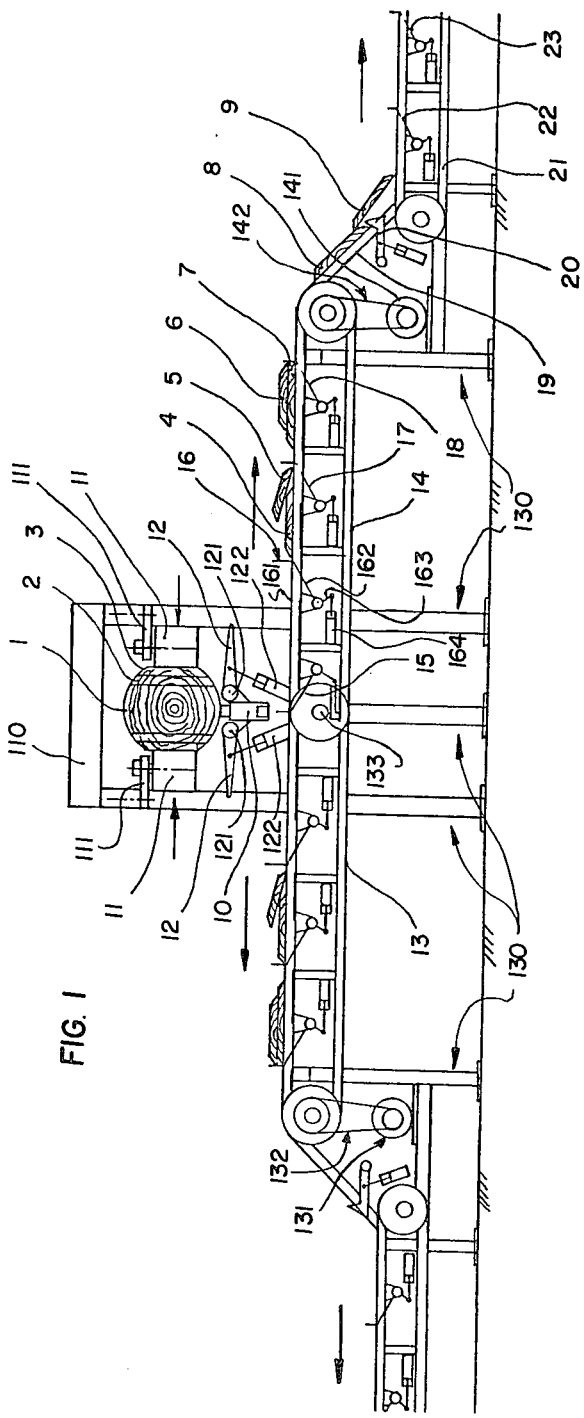
FIG. 1 is a side elevational view which shows one preferred embodiment of the invention.
Figure 2:
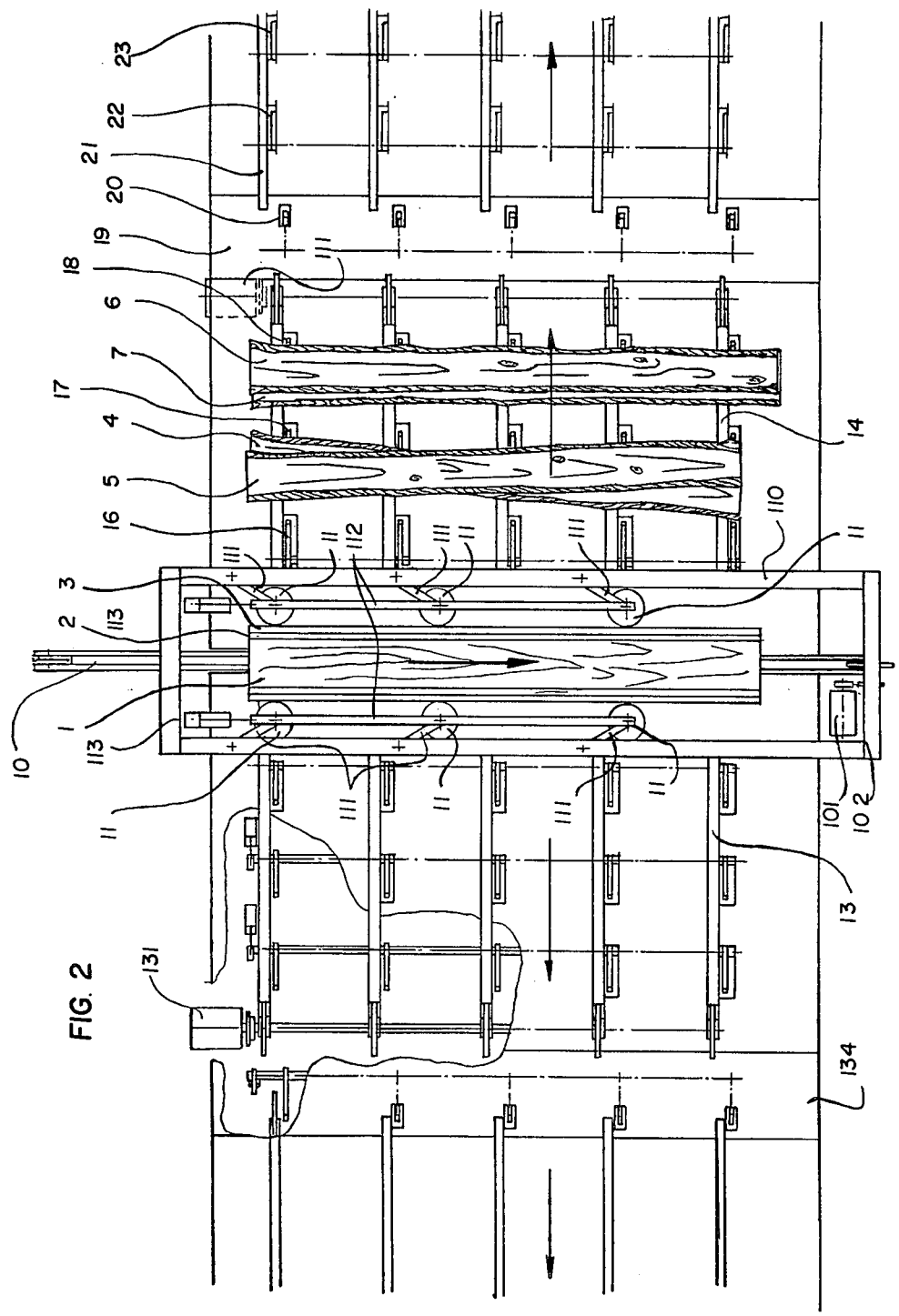
FIG. 2 is a top plan view which shows the embodiment of the invention of FIG. 1.

Referring to FIGS. 1 and 2, are application of the feeding apparatus of the invention to be used in connection with a four-band saw or equivalent in order to separate side boards comprises the following parts: the side guards 11, which are suitably arranged at both sides of the log or block conveyor 10, the dropping flaps 12, which are attached below the side guards 11, the transverse conveyors 13, 14, on top of which the side boards are dropped, the sloping plane 19, which is arranged in connection with the transverse conveyor and the stopping members 20, (35 in FIGS. 8A to 8C), which are assembled onto the sloping plane.

The transportation of the block from the four-band saw, which is not illustrated in the drawing, to the feeding station takes place by a generally known conveyor 10, which is operated for example by means of a gear assembly motor 101 and the chain gearing 102.

One or several pairs of side guards 11 are arranged at suitable intervals from each other, symmetrically somewhat above the block or log conveyor 10, at both sides thereof. The side guards are movably attached to the frame 110 by means of the shafts 111. They are also connected to each other by means of bar 112, to the other end of which bar is also connected the piston of a hydraulic cylinder 113.

The dropping flaps 12 are formed of shaft-like members attached to a commom axis 121 at suitable intervals, for instance 50 cm between each other. The axis 121 is suitably articulated adjacent the conveyor 10. The slope of the dropping flaps 12 can be adjusted by means of the hydraulic cylinder 122. They are located at either end of the dropping flap 12 outside the space required by the conveyors 13, 14. The cylinder part of the hydraulic cylinder 122 is attached for example to the frame of the conveyors 13, 14 and the piston to the shaft-like member of the dropping flap 12.

The transverse conveyors 13, 14 are generally known chain or band conveyors, which are mounted on the frame 130 below the first conveyor 10. Both conveyors are operated by means of gear assembly motors 131, 141 and the chain gearing 132, 142. The folder wheels of the conveyors 13, 14 are geared to the same axis 133 so that each conveyor can be driven both forwards and backwards.

Associated with conveyors 13, 14 are transient stops 16, 17, 18. The stops, for instance the stop 16, are formed of suitably bended shafts 162 attached to the axis 161. The axis is geared below the conveyor 13. The shafts 162 are located in the transverse direction of the conveyor 14 for example at one meter intervals. At the end of the axis 161 there is attached the auxiliar shaft 163, to which is connected the piston of a hydraulic cylinder 164. The stops 16, 17 and 18 have two positions: the upper position, where they hinder the boards from shifting on the conveyor, and the lower position, where they are turned aside and release the boards to move freely on the conveyor. The position of the stops is suitably adjusted by means of the hydraulic cylinders.

By means of the sloping plane 19 the conveyors 13, 14 are connected to equivalent conveyors 21 located on a lower level, which conveyors are similarily provided with transient stops 22, 23. The sloping plane 19 is formed for example of steel bars 135 (FIG. 4) attached at definite intervals to the frame 130, which steel bars are covered by a steel plate 134. Below the steel bars are installed the supports 136, whereto the axis 201 of the stopping member 20 is suitably connected.

The stopping members 20 are formed of hook-like or chape-like members 202, welded to the axis 201 at suitable intervals, for example at the distance of one meter between each other. To the stopping member 20 located near the end of the axis 201 is connected the piston of the hydraulic cylinder 203, which cylinder is attached to the frame. By means of the hydraulic cylinder the position of the stopping member 20 can be adjusted in relation to the sloping plane 19 from positions A to B corresponding to FIGS. 4 and 5 respectively. The stopping members have preferably one or several intermediate positions for separating the boards. In the lowermost position (B, FIG. 5) the stopping members 20 are completely under the sloping plane 19.

The feeding apparatus of the invention functions in the following fashion. By means of the conveyor 30 the block 1 together with its side boards is transported from the sawing station to the feeding station. By employing the hydraulic cylinder 113, the side boards 2, 3 are pressed against the block 1 with the side guards 11, until the conveyor 10 has transported the sawed log to the vicinity of the dropping flaps 12 and the transverse conveyors 13, 14. The side guards 11 are opened and the dropping flaps 12, the slope whereof is suitably adjusted, conduct the side boards 2, 3 onto the transverse conveyors 12, 13.

When falling down, the boards 2 and 3 collide against the transient stops 16 of the transverse conveyors 13, 14 (FIG. 3) and are consequently straightened. The hydraulic cylinder 164 is brought into operation, so that the stops 16 are turned aside and the conveyors 13 and 14 transport the boards against the next stops 17. Owing to the power of the collision, the boards which in the previous phase were left crosswise or in a laminating position, such as the boards 4 and 5 (FIGS. 1 and 2), are piled on top of each other.

Figure 3:
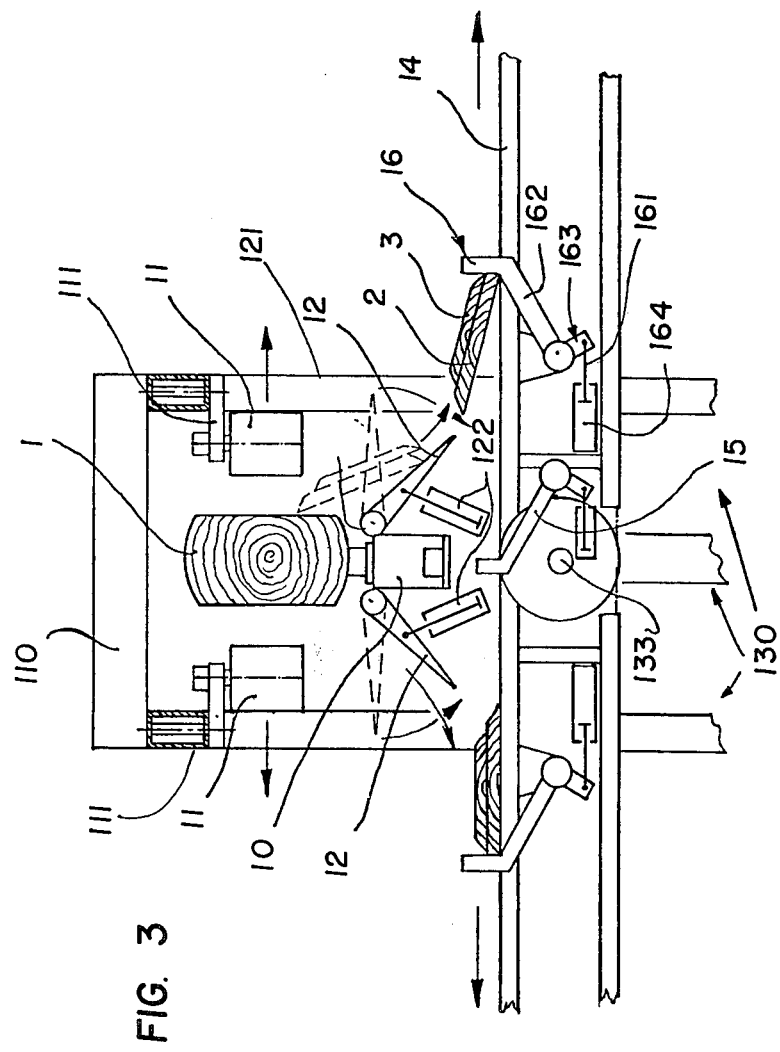
FIG. 3 illustrates how the boards are dropped onto the transverse conveyor.

FIG. 3 also shows how the side guards 11 are opened at the same time as the dropping flaps 12 are lowered to their lowermost position, and the boards 2 and 3 are directed onto the transverse conveyors 13 and 14 with their cant edge upwards.

When sawing only one board from each side of a log or block, or when for some other reason it is desired to direct all lumber onto one side of the block line, it is possible to drive either the conveyor 13 or 14 backwards, so that the stop 15 controls the feeding of the boards either onto the conveyor 13 or 14.

Figure 4:
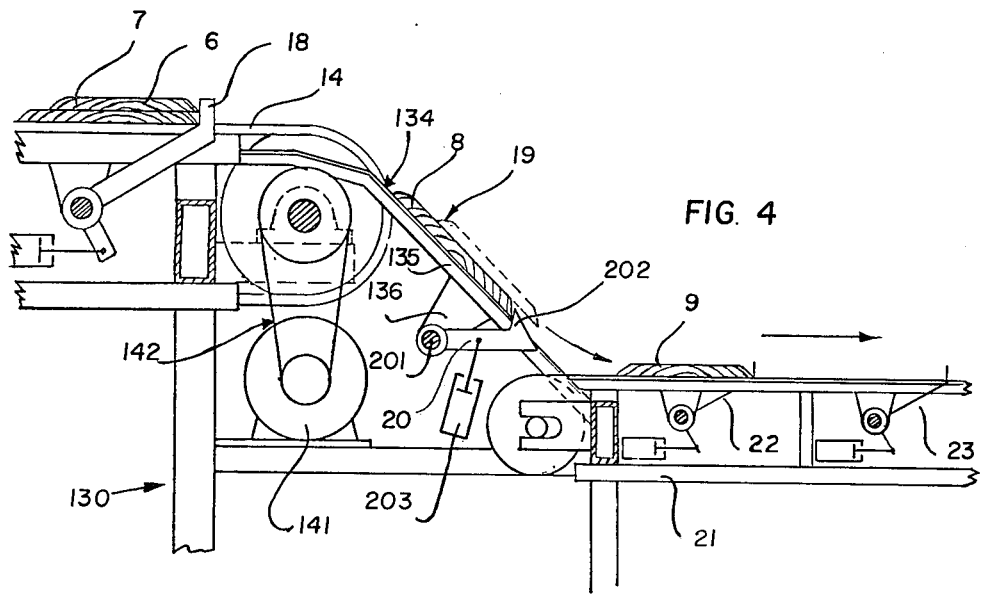
FIGS. 4 and 5 illustrate how the boards are separated by shifting them from the upper conveyor to the lower conveyor.
Figure 5:
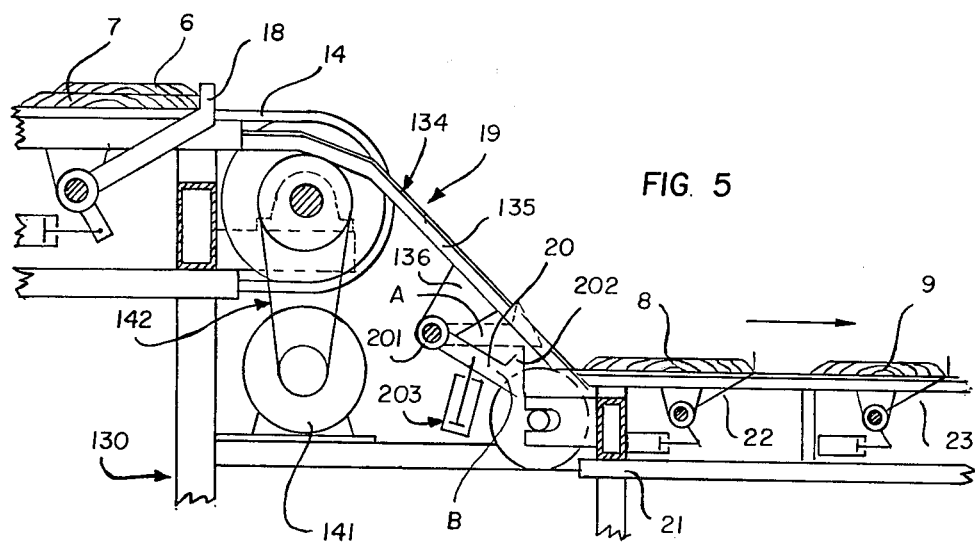

FIG. 4 illustrates a phase where the boards 6 and 7 have arrived at the transient stops 18 of the transverse conveyor 14, and the board 8 has stopped at the stopping members 20 located on the sloping plane 19, and the board 9 has continued to move against the stop 22 of the conveyor 21 located on the lower level. Now the stop 22 is turned aside and allows thus the board 9 to proceed against the stop 23. When the board 9 is registered at the stop 23, the stop 22 is lifted up and the stopping member 20 lets the board 8 to proceed against the stop 22. After this the stopping member 20 is lifted up by utilizing the hydraulic cylinder 203. When the stop 22 has been released off the board 8 and lifted up, the stop 18 is lowered and the boards 6 and 7 are released from the conveyor 14 to proceed into separation. The feeding process now continues in similar fashion.

Figure 6:
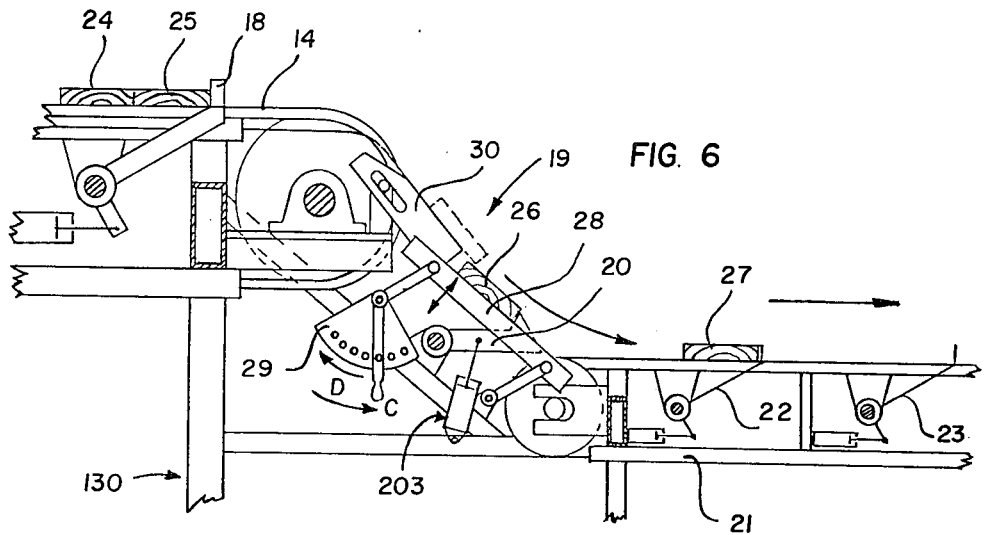
FIGS. 6 and 7 illustrate one preferred embodiment of the invention, where boards coming in succession from the conveyor are separated.
Figure 7:
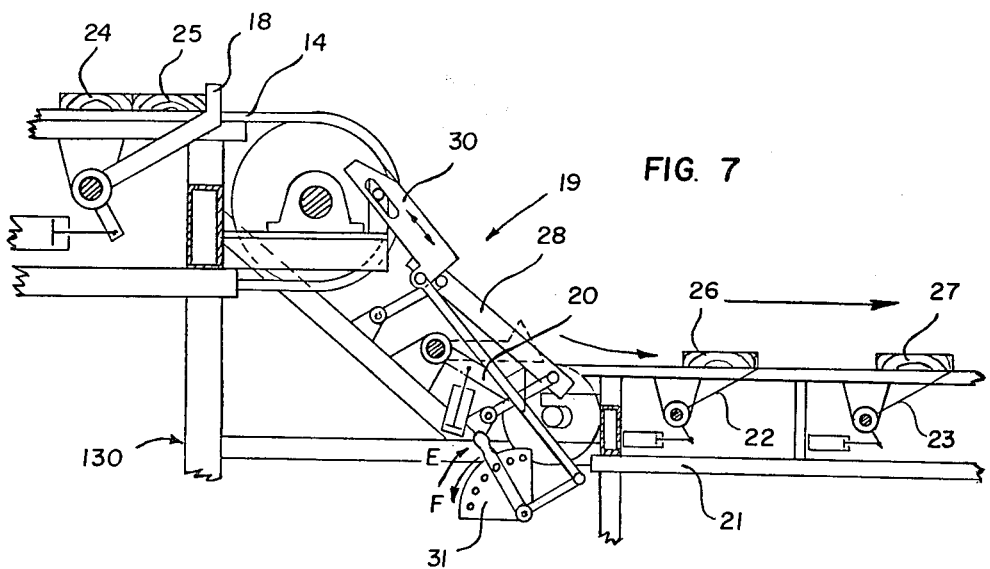

One preferred embodiment of the sloping plane and the stopping member connected to the feeding apparatus of the invention is illustrated in FIGS. 6 and 7. Here the sloping plane 19 of FIG. 4 has been replaced by an adjustable plane 28. In addition to this, there is arranged an echelonment 30 and stopping members 20. The echelonment 30, the plane 28 and the stopping means 20 together form an adjustable pocket or equivalent for separating the side boards.

By means of a controller, such as the lever 29 connected to the plane 28, the slope of the plane and thus the depth of the pocket can be adjusted according to the thickness of the piece of lumber (FIG. 6). When turning the lever 29 stepwise towards the direction c, the plane 28 is lifted, and respectively when turning the lever in the direction d, the plane is lowered. Consequently the height of the stopping member 20 changes with respect to the plane 28.

The echelonment 30 can be adjusted by means of a suitable controller such as the lever 31 (FIG. 7), according to the width of the lumber in process, for separating the boards 24, 25 which arrive in succession from the conveyor 14. When turning the lever 31 stepwise towards the direction F, the distance between the echelonment 30 and the stopping member increases, whereas when turning the lever in the direction E the distance decreases and the pocket becomes narrower. FIG. 6 shows how the first board 26 has stopped in the pocket and the second board 27 has proceeded over the first one and met the stop 22 of the lower conveyor 21.

Figure 8A:
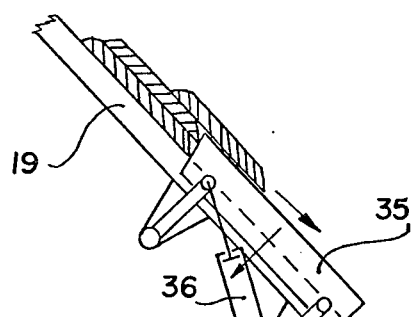
FIGS. 8A, 8B, 8C, 9A and 9B illustrate different applications of the invention, which can be employed for separating more than two boards from each other.
Figure 8B:
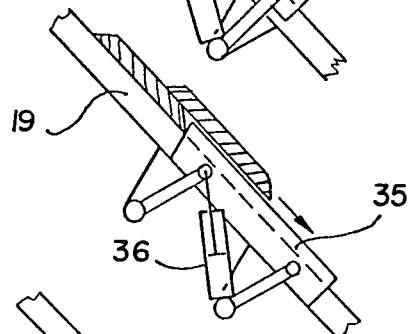
Figure 8C:
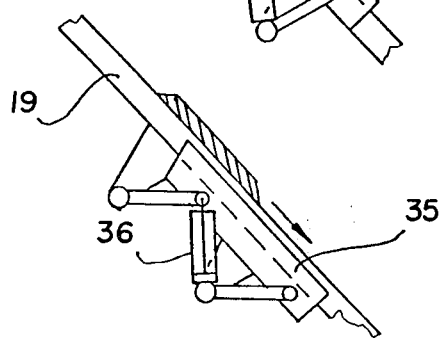
Figure 9A:
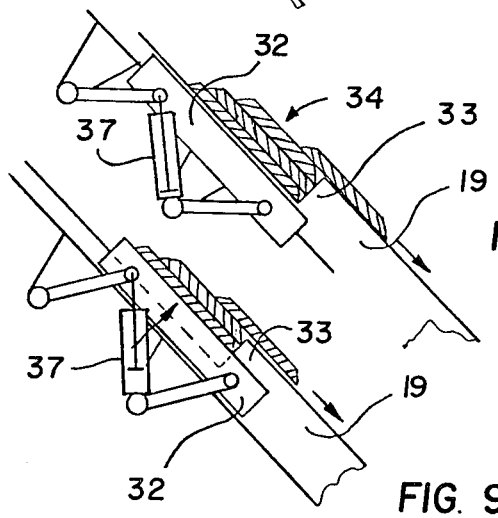
Figure 9B:
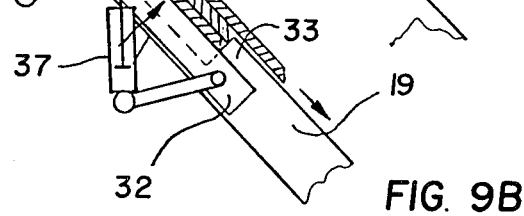

FIGS. 8 and 9 illustrate two more applications for the sloping plane and the stopping members. In FIG. 8 the stopping members are formed of plate-like or similar members 35, which are operated by the hydraulic cylinder 36 and are parallel to the plane 19 and roughly rectangular in cross-section, and which members are adjustably attached to the immediate neighbourhood of the plane 19. FIG. 8 illustrates the different working positions (FIGS. 8A, 8B and 8C of the stopping member. In FIG. 9 the stopping members are formed of stationary stops 33, arranged on the sloping plane 19, and of the hoisting apparatus 32 rising from under the plane 19, by means of which the side boards 34 are lifted and fed one by one or in suitable groups into further processing.

While specific embodiments of the invention have been shown and described in detail to illustrate the application of the principles of the invention, it will be understood that the invention may be embodied otherwise without departing from such principles.

I claim:

1. A method for feeding side boards that are cut from a piece of lumber with a device including at least one side guard for holding a board against a piece of lumber from which it was cut, a first conveyor for transferring the piece of lumber and side board to the side guard, a transverse conveyor for conveying side boards, stop means for holding boards on the transverse conveyor from moving on the transverse conveyor and at least one dropping flap which is movable to direct a side board from the first to the transverse conveyor, comprising, opening the side guard to release a side board from a piece of lumber, positioning the dropping flap to direct the side board onto the transverse conveyor, and moving the stop means into a path of the side board on the transverse conveyor to shift the side board on the transverse conveyor.

2. A method according to claim 1, wherein the device includes a side guard on either side of the first conveyor, a transverse conveyor on either side of the first conveyor and at least two dropping flaps each associated with one side guard, said method including feeding a plurality of side boards on either side of a piece of lumber from which the side boards are cut by opening each of the side guards and positioning each of the dropping flaps to direct at least two side boards from either side of the piece of lumber onto the transverse conveyors in overlapping arrangement and moving the stop means to align each side board into a pile on each transverse conveyor.

3. A method according to claim 2, wherein the device includes a sloping plane at a far end of each transverse conveyor with respect to the first conveyor and at least one stop member movable with respect to each sloping plane, the method including moving each stop member into at least two different positions, so that in a first position and uppermost side board in each pile continues moving along the sloping plane and, in a second position to release an additional board from the pile.

4. A method according to claim 3, wherein for separately feeding side boards which are in a pile on the transverse conveyor with more than two side boards, the method including moving each stopping member into additional positions or releasing each side board one at a time from each pile until all boards on each pile have been released from the sloping plane.

5. An apparatus for feeding and separating side boards having cant edges and being cut from a piece of lumber from a four-band saw, comprising:
a first conveyor for conveying a piece of lumber with side boards;
a side guard on each side of said first conveyor for holding side boards on each side of a piece of lumber, said side guards being movable to drop side boards from the piece of lumber;
a dropping flap located below each side guard and having a slop which is adjustable;
at least one transverse conveyor having a top for receiving side boards from said dropping flaps with cant edges of the side boards positioned upwardly and the side boards piled on top of each other on said transverse conveyor;
a sloping plane associated with said transverse conveyor and extending parallel thereto for receiving side boards in piles from said transverse conveyor; and
stopping members associated with said slope plane and movable into a plurality of positions for selectively releasing one side board at a time from a pile of side boards on said transverse conveyor;
said side guards and dropping flaps being movable to release and direct side boards from a piece of lumber onto said at least transverse conveyor.

6. An apparatus according to claim 5, wherein said dropping flaps are formed of shaft-like members located at intervals along said first conveyor, each of said shaft-like members articulated near said first conveyor for movement.

7. An apparatus according to claim 5, wherein said transverse conveyor comprises a chain conveyor.

8. An apparatus according to claim 5, wherein said transverse conveyor comprises a band conveyor.

9. An apparatus according to claim 5, including transient stops movably mounted into a position intercepting a path of side boards on said transverse conveyor for aligning piles of side boards on said transverse conveyor and into a position away from a path of movement of side boards on said transverse conveyor.

10. An apparatus according to claim 5, wherein said stop members each comprise a hook-like member articulated for movement to one of said sloping plains.

11. An apparatus according to claim 5, wherein said stopping members each comprise a plate member extending parallel to said sloping plane having a substantially rectangular cross section and movably mounted to said sloping plane.

12. An apparatus according to claim 5, wherein said stopping members form a pocket for receiving a pile of side boards and means for adjusting a slope of said sloping plane for regulating a depth of said pocket to selectively and individually release one side board at a time from a pile in said pocket.

13. An apparatus according to claim 5, wherein said stopping members each comprise a stationary stop associated with each sloping plane and hoisting means associated with said sloping plane movable to lift a pile of said boards above said stationary stop for individually releasing one side board at a time from a pile engaged said stationary stop.

* * * * *

UNITED STATES PATENT AND TRADEMARK OFFICE
CERTIFICATE OF CORRECTION

PATENT NO. : 4,475,644
DATED : October 9, 1984
INVENTOR(S) : Jorma Raippo

It is certified that error appears in the above-identified patent and that said Letters Patent is hereby corrected as shown below:

On the title page item /73/ should reed

-- /73/ Assignee: A. Ahlstrom Osakeyhtio, Karhula, Finland --

Signed and Sealed this

Twenty-sixth Day of March 1985

[SEAL]

Attest:

DONALD J. QUIGG

Attesting Officer     Acting Commissioner of Patents and Trademarks